United States Patent
Kosan et al.

(10) Patent No.: US 6,676,739 B2
(45) Date of Patent: Jan. 13, 2004

(54) METHOD FOR PRODUCING A CELLULOSE SOLUTION IN AN AQUEOUS AMINE OXIDE, SAID SOLUTION HAVING AN INCREASED THERMAL STABILITY

(75) Inventors: Birgit Kosan, Rudolstadt (DE); Christoph Michels, Rudolstadt (DE); Ralf-Uwe Bauer, Rudolstadt (DE); Michael Mooz, Volkmannsdorf (DE); Frank-Gunter Niemz, Rudolstadt (DE)

(73) Assignee: Thuringishces Institut fur Textil und Kunststoff-Forschung E.V., Rudolstadt (DE)

( * ) Notice: Subject to any disclaimer, the term of this patent is extended or adjusted under 35 U.S.C. 154(b) by 0 days.

(21) Appl. No.: 10/220,230
(22) PCT Filed: Jan. 17, 2001
(86) PCT No.: PCT/DE01/00206
§ 371 (c)(1),
(2), (4) Date: Oct. 29, 2002
(87) PCT Pub. No.: WO01/64775
PCT Pub. Date: Sep. 7, 2001

(65) Prior Publication Data

US 2003/0159620 A1 Aug. 28, 2003

(30) Foreign Application Priority Data

Feb. 28, 2000 (DE) .......................................... 100 09 471

(51) Int. Cl.⁷ ...................... C08L 1/02; C09D 101/02; C08B 16/00
(52) U.S. Cl. ................................ 106/200.2; 106/200.3; 536/57; 536/127
(58) Field of Search ........................... 106/200.2, 200.3; 536/57, 127

(56) References Cited

U.S. PATENT DOCUMENTS

| | | |
|---|---|---|
| 4,324,593 A | 4/1982 | Varga |
| 5,602,247 A | 2/1997 | Mulleder et al. |
| 5,792,399 A * | 8/1998 | Meister et al. .............. 264/101 |

FOREIGN PATENT DOCUMENTS

DE      229 708 A1     12/1984

* cited by examiner

Primary Examiner—David Brunsman
(74) Attorney, Agent, or Firm—Marianne Fuierer; Steven J. Hultquist; Yongzhi Yang

(57) ABSTRACT

The invention relates to a method for producing a cellulose solution in an aqueous amine oxide, preferably N-methyl-morpholine-N-oxide, for processing to form cellulosed moulded bodies according to the Lyocell method, whereby said solution has an increased thermal stability. Cellulose is suspended in an aqueous amine oxide and the suspension is converted into the cellulose solution. The inventive method is characterised in that the base use of the cellulose used for producing the solution and of the optionally used additives is detected in a dispersion in aqueous amine oxide solution and in that the cellulose solution is formed by adding a base quantity which matches the detected own consumption of the cellulose and optionally the additives. Cellulose solutions having a stability which is essentially independent from the provenance of the used cellulose can he formed.

16 Claims, 2 Drawing Sheets

METHOD FOR PRODUCING A CELLULOSE SOLUTION IN AN AQUEOUS AMINE OXIDE, SAID SOLUTION HAVING AN INCREASED THERMAL STABILITY

CROSS-REFERENCE TO RELATED APPLICATIONS

This application is filed under the provisions of 35 U. S.C. §371 and claims the priority of International Patent Application No. PCT/DE01/00206 filed Jan. 17, 2001, which in turn claims priority of German Patent Application No. 100 09 471.6 filed Feb. 28, 2000.

BACKGROUND OF THE INVENTION

1. Field of Technology

The invention relates to a method for the preparation of a solution with increased thermal stability of cellulose in aqueous amine oxide, preferably N-methylmorpholine-N-oxide, for the processing into cellulose molded articles according to the Lyocell method, where pulp is suspended in aqueous amine oxide and the suspension is converted into the cellulose solution.

2. Description or Related Art

From literature (K. Götze Chemiefasern nach dem Viskoseverfahren [Chemical fibers according to the viscose method], Volume I, page 362 to 369, published by Springer, Berlin/Heidelberg/New York, 1967) it is known that the reduction of cellulose strongly depends on the pH value and that in the presence of oxidation agents, the ratio of reducing carbonyl- and hydroxyl groups to carboxyl groups also strongly depends on the pH value.

The dissolution of cellulose in aqueous amine oxides in heat also leads to reduction processes because the amine oxides on the one hand represent oxidation agents with weakly basic properties, and on the other hand, the reduction easily leads to byproducts such as primary and secondary amines, which have strong alkaline properties.

DD 218 104 claims the addition of one or more substances with an alkaline effect in quantities of 0.1 to 10% relative to the cellulose solution for the stabilization of melts comprised of cellulose and amine oxides.

U.S. Pat No. 4 324 593 proposes an addition of amines, aqueous ammonia or alkaline hydroxides to increase the dissolution speed of cellulose in amine oxides. The acceleration effect supposedly depends on the change of the pH-value.

WO 95/23837 proposes for increasing the stability of the solutions of cellulose in amine oxides, preferably N-methylmorpholine-N-oxide, that the regenerated tertiary amine oxide has a pH-value depending on the amine oxide concentration A according to the following equation $$pH = -0.0015 \times A^2 + 0.2816 \times A + f$$

and that said value is adjusted by adding alkaline substances and/or by passing the amine oxides over ion exchangers. The equation is supposed to apply in the range of 40% ≦A ≧86% with f=1.00 for the upper limit and f=−1.80 for the lower limit.

Unfortunately, increasing the stability by adjusting the pH-value of the amine oxide solution is described only for solutions that comprise both gallic acid propyl ester and hydroxylamine as stabilizers. The component of the stabilization that can be attributed solely to the adjustment of the pH-value is not mentioned.

From the definition of the pH-value as a negative logarithm of the hydrogen ion activity, it can be concluded that it applies only for very diluted aqueous solutions and changes strongly with the temperature due to the temperature dependence of the movements of the ions. The measurement of the pH-value with solutions of 86% NMMO having a melting point of approximately 70° C. thus does not appear to make much sense.

BRIEF DESCRIPTION OF THE DRAWINGS

Measurements of the pH-value of aqueous NMMO-solutions in the concentration range of 4 to 77% NMMO at 22° C. lead to a dependency according to FIG. 1. The pH-value follows the equation (1)

$$pH = 0.0006 \, c^2 + 0.0224 c + 7.38 \tag{1}$$

and increases from pH~7.4 for c→0 to pH~12.0 at c=76.6%. This equation has a physical meaning because for c→4 0, the pH of the infinitely diluted amine oxide corresponds to that of a very weak basic solution. When calculating the pH value of the amine oxide solution, as it results from the pure dilution and/or concentration, the result is a curve according to the equation (2) in FIG. 1.

$$pH = 0.4328 \, \ln c + 6.82 \tag{2}$$

A comparison of equation (1) and (2) shows the increase of the measured pH-value is significantly stronger than the corresponding increase of the NMMO content. This can be explained only with an increase of the dissociation as the concentration increases and/or the measurement of the pH-value is not realistic.

Figure 1:
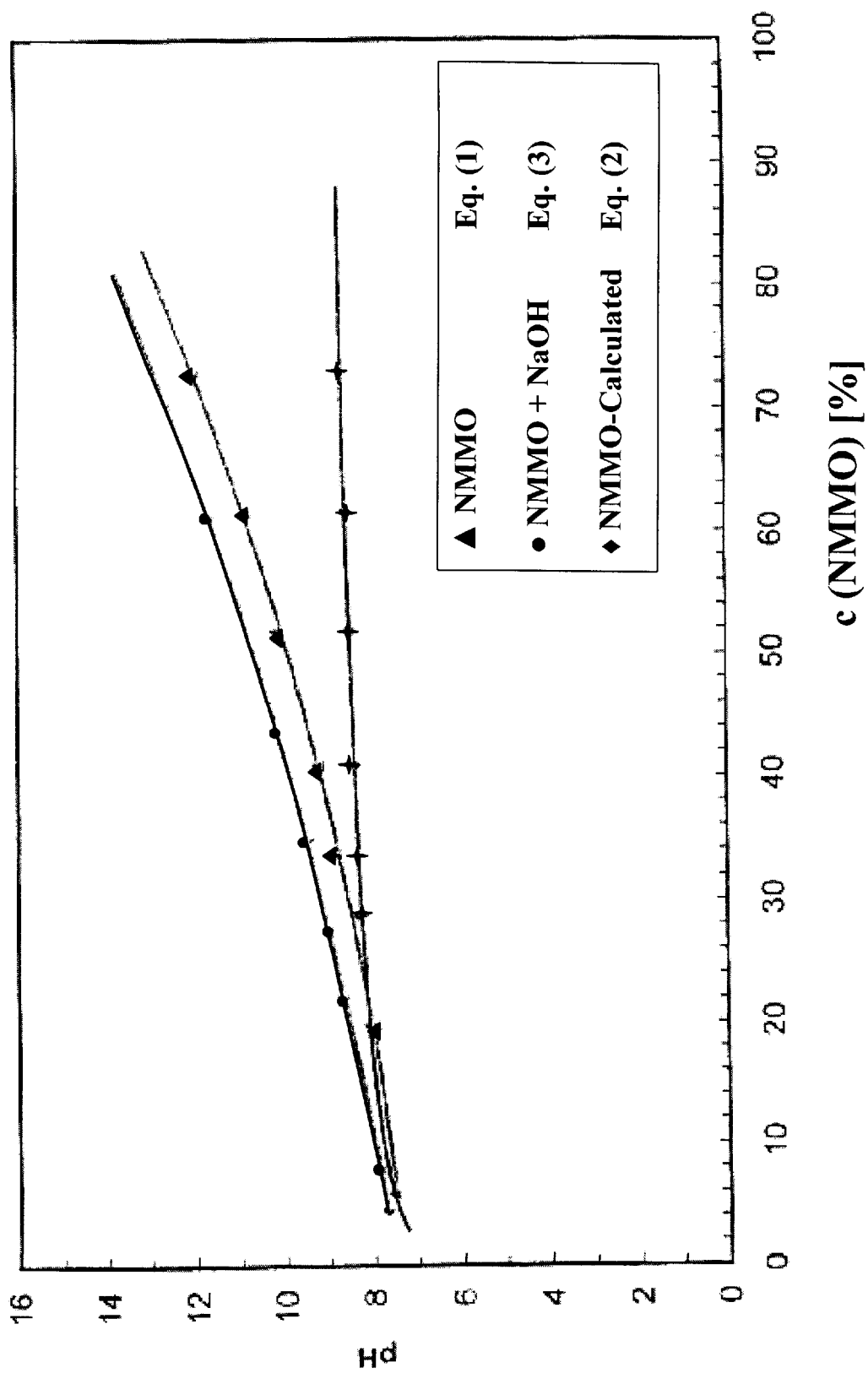

The measurement with the addition of 0.07 grams NaOH per kg NMMO monohydrate finally leads to the curve according to the equation (3) in FIG. 1.

$$pH = 0.0004 \, c^2 + 0.0417 \, c + 7.53 \tag{3}$$

The pH-value of the solution increases, but the increase analogue to (1) is greater than could have been expected according to the calculation.

A stabilizing effect of the alkali additive to the amine oxide is difficult to explain because the NMMO-monohydrate in the cellulose solution according to equation (1) has a calculated pH-value of 13.8.

Figure 2:
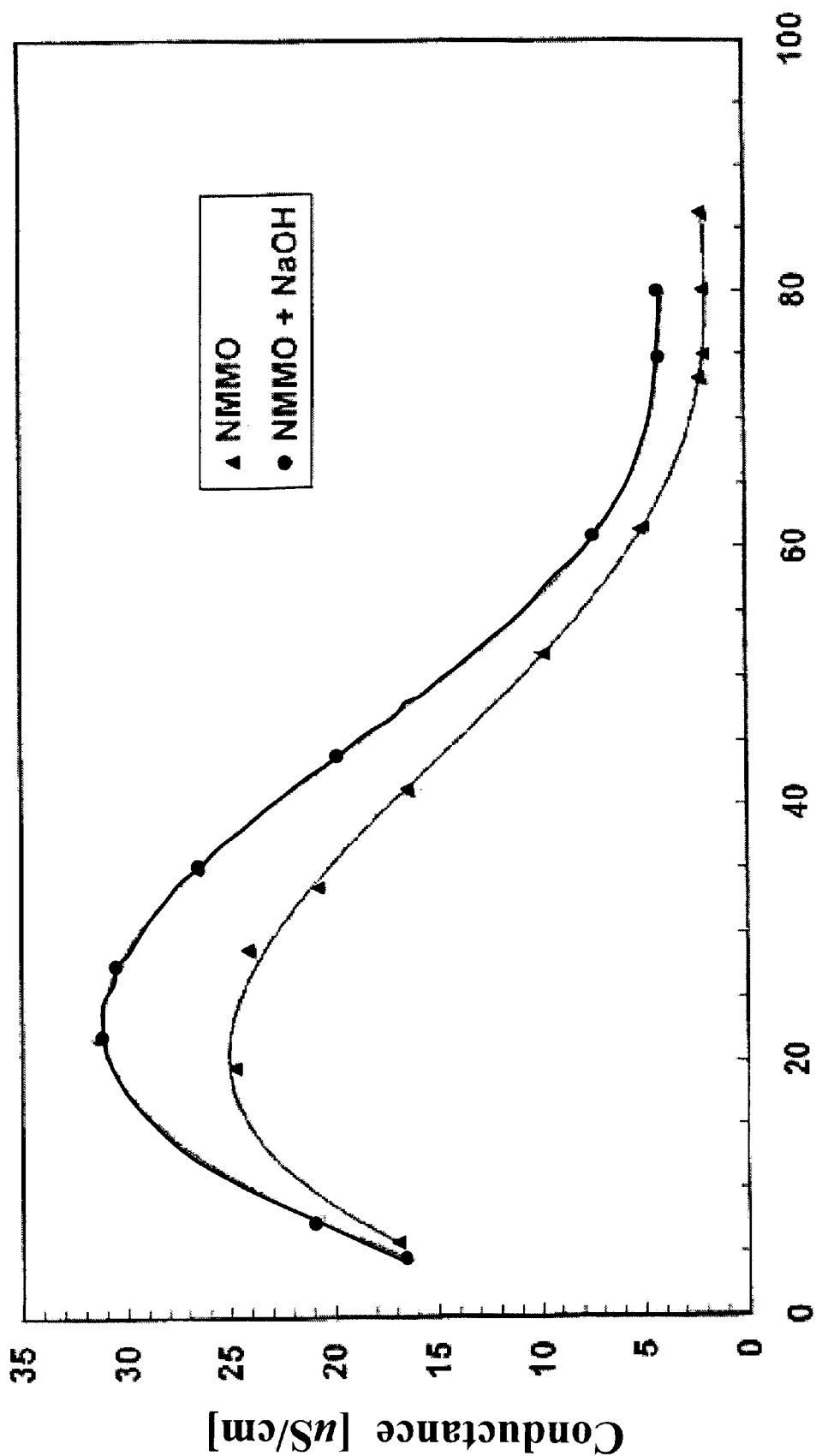

The measurement of the conductive capacities of the solutions according to equation (1) and (3) is shown in FIG. 2. Proceeding from the assumption that the conductivity of pure water is 1–2 $\mu$S per centimeter, the conductivity will first increase, then reach a maximum at approximately 20% NMMO, only to drop back to approximately 2 $\mu$S per centimeter at higher concentrations. The addition of NaOH leads to a slight shift of the maximum conductivity to approx. 25% NMMO, but the curve trace basically remains the same.

SUMMARY OF THE INVENTION

The problem to be solved by the present invention is to provide a method to produce a solution with an increased thermal stability of cellulose in aqueous amine oxide for application in the Lyocell process. Especially, the goal is to provide a cellulose solution with a stability that is largely independent on the pulp used, and especially its provenance. In addition, a goal is to produce cellulose solutions with increased stability in the subsequent processing even from pulps that tend to form solutions with lesser stability. Other advantages are listed in the description that follows.

The object of the invention is attained with the aforementioned method according to the invention in that the internal consumption of the alkaline solution of the pulp used for the preparation of the solution and, if applicable, the additives that are used, is determined in a dispersion in aqueous amide oxide solution, and the cellulose solution is produced with the addition of a quantity of alkaline solution that corresponds to the internal consumption of the pulp and, if applicable, the additives. In accordance with the invention, it was found that it is not the alkalinity of the amine oxide that has the primary stabilizing effect on the cellulose/amine oxide/water system, but rather that a compensation of the alkaline consumption of the pulp used (and the additives, if applicable), which leads to a stabilization of the solution obtained. Furthermore, it was found that additional components such as the stabilizer, for example, such as propyl gallate, diluents, such as dimethylsulfoxide, ϵ-aminocaprolactame, pyrrolidone, as well as colorants, pigments, etc. have more or less of an internal consumption of alkaline solution.

The alkaline consumption of the pulp can be the result of two components, i.e. on the one hand the content of the carboxyl group of the cellulose and on the other hand a more or less large content of foreign acids. The latter can be removed by washing the pulp sample. The alkaline consumption of the additives can have various causes.- The propyl gallate, for example, may use equimolar quantities of alkaline because the dissolution process in aqueous amine oxides may be connected with a decomposition of the ester. The equimolar consumption of alkaline is a result of the neutralization of the generated gallic acid. The equimolar alkaline consumption is the result of the neutralization of the developed gallic acid.

DETAILED DESCRIPTION OF THE INVENTION

According to the preferred embodiment of the method in accordance with the invention, the internal alkaline consumption of the pulp is determined in the dispersion at a pH-value of the amine oxide solution of $8.5 < p_H < 10.5$. It was shown that the stability of the solution is at an optimum when the pulp used and, if applicable, the additives, are neutralized in that range until a PH-value is reached.

Preferably, the internal alkaline consumption of the pulp and, if applicable, the additives is determined in that (a) an aqueous solution containing 5 to 30 percent-by-mass amine oxide is titrated with a normal solution of the alkaline solution against an indicator with a half-value stage of 8.5 and 10.5 and (b) a specific quantity of the pulp and, if applicable, the additives is dispersed and, if applicable, dissolved in the titrated solution and the internal alkaline consumption of the pulp and, if applicable, the additives, is determined with a new titration as in step (a). Preferably, one would proceed from an aqueous solution containing 10 to 20 percent-by-mass amine oxide and use a 0.1 n solution as normal solution of the alkaline solution. From the conductivity measurements (FIG. 2), it can be concluded that measurements performed with amine oxide concentrations below the maximum of the conductivity of the solution should lead to realistic measuring results. The receiver quantity of pulp n in step (b) in grams (atro) is a result of $$n = \frac{c_{Cell.} \cdot E \cdot A}{86.7 \cdot (100 - c_{Cell.})} [g] \quad (4)$$

-continued $c_{Cell}$ = cellulose content in %, from the polymer solution $E$ = weighted-in quality of amine oxide in grams $A$ = content of the amine oxide in %

In that way, the provenance of the pulp selected as receiver should be the same as that used in the Lyocell process. The alkaline consumption of the pulp provenance is determined through renewed titration, and the required alkaline addition per unit quantity of pulp is calculated according to the formula $$g\ Base/kgZellstoff = \frac{a \cdot M \cdot c_{Base}}{n} \quad (5)$$

[base = alkaline, Zellstoff = pulp]

$a$ = consumed ml alkaline solution for second titration $c_{Base}$ = normality of the alkaline solution $M$ = mol mass of the alkaline substance If a cellulose solution is supposed to have additional components, said additional components are dispersed and/or dissolved in the appropriate quantity together with the pulp in the titrated amine oxide solution, the internal alkaline consumption of pulp and additional components is determined by titration, and the required alkaline addition per unit quantity of cellulose including the additives is calculated.

Preferably, the indicator is selected from the group comprised of phenolphthaleins with a half-stage of 9.5 p-xylenolphthaleine with a half-stage of 9.7 and thymol blue with a half-stage of 8.9. When the neutralization is performed with these indicators, the $p_H$-values reached in the suspension for the preparation of the solution are especially favorable for the stability of the solution, regardless of the varying consumption of the cellulose provenances and possible alkaline additives, and independent of the influence of the amine oxide in the suspension, which need not be uniform if it comes from the reprocessing, for example from a used spinning bath.

Appropriately, the alkaline quantity corresponding to the internal alkaline consumption is pre-dissolved before, during or after the placing of the pulp and the additives, if applicable, in the aqueous amine oxide. Preferably, all foreign ions are removed from the amine oxide through an ion exchanger regardless of its origin.

Preferably, the alkaline solution(s) used to compensate for the internal consumption of the pulp during the preparation of the solution is an alkaline solution with $[OH^-] > 5.6 \cdot 10^{-4}$ mol per liter, preferably alkali or alkali earth hydroxide, secondary, tertiary or quaternary amines.

Generally the cellulose solution is prepared from a pulp suspension in aqueous amine oxide by water evaporation at increased temperature under vacuum. The temperature can be in the range of 60 to 100° C., and the vacuum in the range of 10 to 600 mbar, especially 30 to 450 mbar.

The invention is explained in further detail in the following with examples and reference examples.

EXAMPLE 1

193.9 grams aqueous amine oxide (20.0% NMMO) are placed in an Erlenmeyer flask, mixed with a few drops of phenolphthaleine and titrated with 0.1 n caustic soda solution until it turns from colorless to red. Then 6.1 grams comminuted pulp [spruce sulfite pulp "MoDo 027" by MoDo, Cuoxam DP 505 calculated for a polymer solution with 12% cellulose according to equation (4)] are added, followed by another titration with 0.1 n caustic soda solution until it turns.

g NaOH/kg pulp=4×a/n=4×0.28/6.1=0.184 a=ml 0.1 n NaOH used in second stage 72.0 grams pulp and 13 mg NaOH in 763 grams amine oxide solution (NMMO content 60.0%) are placed in a mixing container, finely dispersed, and transferred into a laboratory kneader. At a temperature of 90° C., 235 ml water are distilled off under vacuum and the cellulose is dissolved. After a follow-up dissolution time of 1 hour, a microscopically homogeneous cellulose solution of yellowish color with a zero shear viscosity of 2,435 Pas at 85° C. and a Cuoxam DP of 460 is obtained.

REFERENCE EXAMPLE 1

Proceeding analogue to Example 1, but without the addition of alkali, a resin-colored solution with a zero shear viscosity of 2,080 Pas at 85° C. and a Cuoxam DP of 440 is obtained.

EXAMPLE 2

193.9 grams aqueous amine oxide (20.0% NMMO) are placed in an Erlenmeyer flask, mixed with a few drops of phenolphthaleine and titrated with 0.1 n caustic soda solution until it turns from colorless to red. Then 6.1 g comminuted pulp [spruce sulfite cellulose Tempsupr" by Tembec, Cuoxam DP 535, calculated for a polymer solution with 12% cellulose according to equation (4)] are added, followed by another titration with 0.1 n caustic soda solution until it turns.

g NaOH/kg pulp=4×2.10/6.1=1.377

Analogue to Example 1, pulp and amine oxide are mixed while adding 99 mg NaOH, and processed into a solution. A yellowish, microscopically homogeneous solution with a zero shear visosity of 3,100 Pas at 85° C. and a Cuoxam DP of 485 i s obtained.

REFERENCE EXAMPLE 2

Proceeding analogue to Example 2, but without the addition of alkali, a yellowish, microscopically homogenous solution with a zero shear viscosity of 2,390 Pas at 85° C. and a Cuoxam DP of 450 is obtained.

EXAMPLE 3

200 grams amine oxide (16.33% NMMO) are placed in an Erlenmeyer flask, mixed with a few drops of p-Xylenolphthaleine and titrated with 0.1 n caustic soda solution until it turns from colorless to blue. 5.93 grams cellulose (kraft cellulose of the Type R by Weyerhaeuser, 95.0% dry content, Cuoxam DP 490, carboxyl group content of 31.5 $\mu$mol/gram, suspended repeatedly in distilled water, washed and dried, calculated for a solution with 13.0% cellulose according to equation (4)] are suspended in the titrated amine oxide and titrated again with 0.1 n caustic soda solution until the color turns blue. The consumption is 1.77 ml 0.1 n NaOH. According to equation (5), this results in an alkaline consumption of 1.258 g NaOH per kg of pulp. It can be easily calculated that the consumption corresponds to 1.77 ml 0.1 n NaOH 31.4 $\mu$mol -COOH per gram of cellulose.

In a parallel experiment, 16.9 mg propyl gallate ×2 water are first dissolved in the titrated amine oxide (corresponds to 0.068 mmol or 0.3% relative to 5.63 grams cellulose) and titrated with 0.1 n NaOH from colorless to blue. The consumption is 0.68 ml 0.1 n NaOH, i.e., the quantity of caustic soda solution that is equimolar to the propyl gallate. The requirement calculated for this stabilization is 0.483 g NaOH per kg pulp. In the titrated solution, 5.93 grams of the same cellulose, but unwashed, are then suspended and titrated until it turns. The consumption is 2.05 ml 0.1 n caustic soda solution, which according to equation (5) corresponds to an alkali consumption of 1.456 g NaOH per kg cellulose. The difference between washed and unwashed cellulose is 1.456−1.258=0.198 grams NaOH per kg pulp and should correspond to an equivalent component of inherent acid.

This results in a total alkali requirement of 1.456+0.483= 1.939 g NaOH per kg pulp for the FR-type of pulp.

2,417 grams amine oxide (dry content 62.4% NMMO), 2.52 grams caustic soda solution (dry content 20.0%) and 0.78 grams propyl gallate ×2 H$_2$O are placed in a kneader with a vertical kneading shaft. After both components are completely dissolved, 274 grams pulp of the type FR (dry content 95.0%) are dispersed and 925 grams water are distilled off at 90° C. and dropping vacuum (450 to 30 mbar). After 30 minutes of follow-up dissolution time, a yellow, microscopically homogenous cellulose solution with 13% cellulose a nd a zero shear viscosity of 6,500 Pas at 85° C. is obtained. The Cuoxam DP of the cellulose regenerated from the solution is 478. The solution can be spun into fibers and/or filament yarns according to the dry-wet-extrusion process without any problems.

REFERENCE EXAMPLE 3

Proceeding analogue to Example 2, 720 mg NaOH are added. A dark brown to black solution with a zero shear viscosity of 1,800 Pas is obtained. The examples 1 and 2 with alkali additives determined in accordance with the invention lead to the highest values for the zero shearing viscosity at 85° C., i.e. they have the lowest reduction. It should be noted here that the alkali requirement of both pulps is different by a factor of 7.5. An alkali addition that is too low (Reference examples 1 and 2) or an alkali addition that is too high (Reference example 3) leads to a stronger reduction and a lower zero shear viscosity.

What is claimed is:

1. A method for the production of a cellulose solution with increased thermal stability of cellulose in aqueous amine oxide, for the processing into cellulose form articles according to the Lyocell process, the method comprising:

suspending cellulose pulp in aqueous amine oxide to form a cellulose pulp suspension in an aqueous amine oxide solution;

determining the alkaline consumption of the cellulose pulp and additives, where applicable, dispersed in the aqueous amine oxide solution; and adding to the cellulose suspension an alkaline substance in a quantity that corresponds to the determined internal consumption of the cellulose and the additives, if applicable, to form a cellulose solution.

2. The method in accordance with claim 1, wherein the internal alkaline consumption of the cellulose pulp in the dispersion is determined at a $p_H$-value of the amine oxide solution of 8.5<$p_H$<10.5.

3. The method in accordance with claim 2, wherein the internal alkaline consumption of the cellulose and, where applicable, the additives, is determined by a) Titrating an aqueous solution containing 5 to 30 percent-by-mass amine oxide with a normal solution of the alkaline solution against an indicator with a half-value stage between 8.5 and 10.5, and b) Dispersing and dissolving, a specific weight quantity of the pulp and the additives, where applicable, in the titrated solution, and determining the internal alkaline consumption of the cellulose and, if applicable, the additives, through a renewed titration as in step a).

4. The method in accordance with claim 3, wherein the indicator is selected from the group comprised of phenolphthaleins with a half-stage of 9.5, p-xylenolphthaleine with a half-stage of 9.7 and thymol blue with a half-stage of 8.9.

5. The method in accordance with claim 3, wherein the alkaline quantity corresponding to the internal alkaline consumption is dissolved in aqueous amine oxide prior to, during, or after the addition of the pulp and, where applicable, the additives.

6. The method in accordance with claim 1, wherein the additives are selected from the group comprised by the stabilizers, diluents for amine oxides, fillers and surfactants and coloring agents.

7. The method in accordance with claim 1, wherein all foreign ions are removed from the amine oxide by an ion exchanger, regardless of its provenance.

8. The method in accordance with claim 1, wherein the alkaline substance is a basic solution(s) with an [OH] $>5.6 \cdot 10^{-4}$ mol/l comprising a member selected from the group consisting of: alkali hydroxide, alkali earth hydroxide, secondary amines, tertiary amines and quaternary amines.

9. The method in accordance with claim 1, further comprising, evaporating water at increased temperature and under vacuum from the cellulose pulp suspension in an aqueous amine oxide solution to form the cellulose solution.

10. The method in accordance with claim 1, wherein the amine oxide is N-methyl-morpholine-N-oxide.

11. The method in accordance with claim 1, wherein the cellulose solution has a higher shear viscosity value relative to a cellulose solution without the addition of an alkaline substance.

12. A method for the production of a cellulose solution with increased thermal stability comprising:

introducing cellulose pulp into an aqueous amine oxide solution to form a cellulose suspension;

determining the alkaline consumption of the cellulose pulp; and compensating for the alkaline consumption of the cellulose pulp by adding a quantity of an alkaline agent to the aqueous amine oxide solution to maintain the pH in the range from about 8.5 to about 10.5.

13. The method according to claim 12, wherein the step of determining the alkaline consumption of the cellulose pulp comprises:

(a) titrating a an aqueous solution containing 5 to 30 percent-by-mass of amine oxide with a normal solution of the alkaline agent against an indicator with a half-value stage of between 8.5 and 10.5;

(b) adding a specific quantity of cellulose pulp to the aqueous amide oxide solution and retitrating with the normal solution of the alkaline agent to determine the quantity of alkaline agent required for indicator to trigger an end signal.

14. The method according to claim 13, where the quantity of the alkaline agent is calculated according to the formula.

$$g\ Base/kgZellstoff = \frac{a \cdot M \cdot c_{Base}}{n} \quad (5)$$

(base = alkaline, Zellstoff = pulp)

$a$ = consumed ml alkaline solution for second titration $c_{Base}$ = normality of the alkaline solution $M$ = mol mass of the alkaline substance.

15. The method according to claim 12, wherein the cellulose suspension may further comprise additional components including stabilizers, diluents, colorants or pigments.

16. The method according to claim 12, wherein the pH is in the range of 8.5<pH<10.5.

* * * * *

UNITED STATES PATENT AND TRADEMARK OFFICE
CERTIFICATE OF CORRECTION

PATENT NO.   : 6,676,739 B2
DATED        : January 13, 2004
INVENTOR(S)  : Kosan et al.

It is certified that error appears in the above-identified patent and that said Letters Patent is hereby corrected as shown below:

Column 2,
Line 19, "c→4 0" should be -- c→ 0 --

Column 3,
Line 45, "PH-value" should be -- pH-value --

Column 5,
Line 42, "visosity" should be -- viscosity --

Column 6,
Line 28, "a nd" should be -- and --

Signed and Sealed this

Thirtieth Day of March, 2004

JON W. DUDAS
*Acting Director of the United States Patent and Trademark Office*